May 8, 1928.
F. P. KOUBEK
1,668,683
SHEET METAL MARKING DEVICE
Filed Aug. 20, 1926
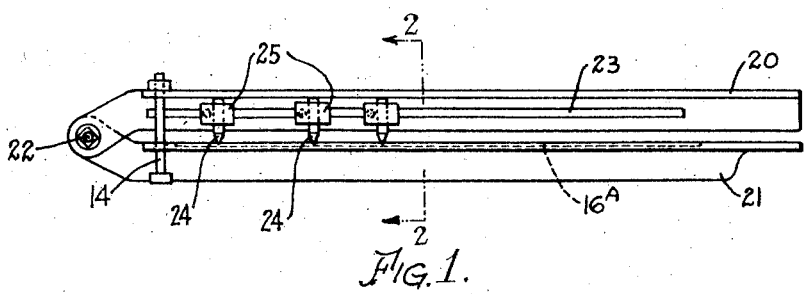
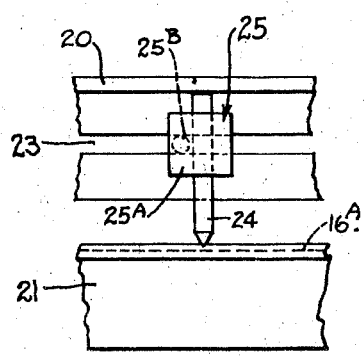
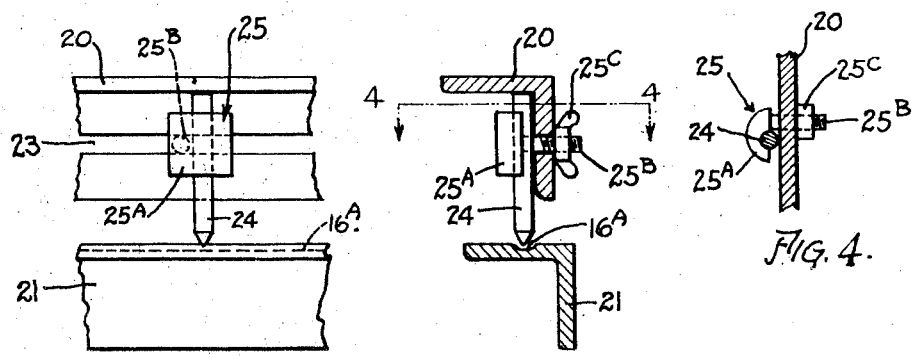
INVENTOR
Frank P. Koubek
BY Frank J. Schraeder Jr.
Attorney Patented May 8, 1928.

1,668,683

UNITED STATES PATENT OFFICE.

FRANK P. KOUBEK, OF BERWYN, ILLINOIS.

SHEET-METAL-MARKING DEVICE.

Application filed August 20, 1926. Serial No. 130,457.

This invention relates to new and useful improvements in sheet metal marking devices, and has among its objects to provide a comparatively simple marking device which can be manufactured at a comparatively low cost, and which shall be efficient in operation to the extent of affording accurate workmanship on the products for which it is used, and which will decrease the time required to execute or construct sheet metal articles of manufacture.

Another object of my invention finds embodiment in the provision of a sheet metal marker comprising a number of pivotally connected members, having adjustably mounted marking pins to afford the use of such device for marking by indentation metal sheets which may be fashioned into various desirable shapes.

With the above and other objects in view, my invention consists in the novel combination, construction and arrangement of the parts and members shown in the accompanying drawings, described in the following specifications, and particularly pointed out in the appended claims.

In the illustrations, Fig. 1 is a side elevation of a sheet metal marker embodying my invention. Fig. 2 is an enlarged cross section taken on line 2—2 of Fig. 1. Fig. 3 is a side elevation of an operation of the pivoted members showing one of the indenting pins and support therefore. Fig. 4 is a cross section taken on line 4—4 of Fig. 2, showing the supporting hook or bearing for the pins.

Referring now to the illustrations, I provide a pair of angle iron members 20 and 21 which are pivotally connected together at 22. The vertical leg of member 20 (as viewed in the illustrations) is provided with a longitudinal slot 23 for the movably mounted supports 25 for the marking pins 24.

The supports 25 comprise bearings $25^A$ of arcuate cross section formed to embrace around one-half of the circumference of the pins 24 and each bearing $25^A$ has an integral right-angularly disposed threaded shank $25^B$ which extends through the slot 23 into a winged tightening nut $25^C$. When the nut $25^C$ is tightened the pin 24 is brought to bear against the vertical leg of the member 20 and is thereby retained against lateral movement.

The advantage of this arcuate bearing is to afford the withdrawal or adjustment of the pin 24 without the removal of the nut $25^C$ from the shank $25^B$.

The lower ends of the pins 24 are pointed and these pointed ends are adapted to partly pass into the longitudinal depression $16^A$ of the member 21 when the members 20 and 21 are pressed together in marking a sheet of metal placed between them.

A gauge bolt 14 is provided near the pivoted ends of the members 20 and 21 which bolt 14 is threaded into the lateral leg of the member 20, (as viewed in Fig. 1.) and is made sufficiently long to permit the spreading apart of the members 20 and 21 about their pivot 22. The bolt 14 passes through the lateral leg of the member 21 through an opening large enough to provide free action. The function of the gauge bolt 14 is to provide a stop or bearing for the edge of the metal or sheet which is to be marked.

From the above description and attached drawings, it will be readily understood that I have provided a simple time-saving sheet metal marker which is adaptable for marking sheets for punching or bending into predetermined shapes suitable for gutters, cornices, and the like.

I claim:

1. A sheet material marker comprising a pair of hingedly connected elongated members, one of said members being of L cross section and having a longitudinally extending slot in one leg thereof, a plurality of supports slidably mounted in said slot, means for each of said supports for securely retaining said supports in predetermined spacings apart in said slot, and a plurality of removable pins adapted to be held in said supports, said pins having pointed ends, and the other of said members having a depression therein adapted to receive a portion of said pointed ends of said pins upon the closing together of said members.

2. A marker as embodied in claim 1, and including said supports comprising an arcuate member having a threaded shank extension, and a nut for retaining said support on said L cross section member, said support adapted to securely retain one of said pins against the slotted leg of said L cross section member and the upper end against the underside of the horizontal leg of said L cross section member.

In witness whereof I affix my signature.

FRANK P. KOUBEK.